(12) United States Patent
Ishii (10) Patent No.: US 9,321,020 B2
(45) Date of Patent: Apr. 26, 2016

(54) CENTRIFUGAL PROCESSING DEVICE

(75) Inventor: Hiroshige Ishii, Tokyo (JP)

(73) Assignee: Hiroshige Ishii, Tokyo (JP)

( * ) Notice: Subject to any disclaimer, the term of this patent is extended or adjusted under 35 U.S.C. 154(b) by 82 days.

(21) Appl. No.: 14/125,278

(22) PCT Filed: Jun. 14, 2012

(86) PCT No.: PCT/JP2012/065185
§ 371 (c)(1),
(2), (4) Date: Dec. 10, 2013

(87) PCT Pub. No.: WO2012/173169
PCT Pub. Date: Dec. 20, 2012

(65) Prior Publication Data
US 2014/0092706 A1    Apr. 3, 2014

(30) Foreign Application Priority Data

Jun. 14, 2011  (JP) .................................. 2011-132521
Jan. 27, 2012  (JP) .................................. 2012-015398

(51) Int. Cl.
| | | |
|---|---|---|
| *B01F 9/02* | (2006.01) | |
| *B01F 9/00* | (2006.01) | |
| *B02C 17/08* | (2006.01) | |
| *B01D 19/00* | (2006.01) | |
| *B01D 19/02* | (2006.01) | |
| *B04B 5/02* | (2006.01) | |

(52) U.S. Cl.
CPC .......... *B01F 9/0003* (2013.01); *B01D 19/0052* (2013.01); *B01D 19/02* (2013.01); *B01F 9/0001* (2013.01); *B02C 17/08* (2013.01); *B04B 5/02* (2013.01)

(58) Field of Classification Search
CPC .............................. B01F 9/0001; B01F 9/0003
USPC ......................... 366/217, 219, 220, 232, 605
See application file for complete search history.

(56) References Cited

U.S. PATENT DOCUMENTS 1,755,763 A * 4/1930 Barber ......................... 134/150
3,229,964 A    1/1966 Wiseman
(Continued)

FOREIGN PATENT DOCUMENTS

| EP | 1839732 A1 | 10/2007 |
|---|---|---|
| JP | S41-005997 Y | 3/1966 |

(Continued)

OTHER PUBLICATIONS

International Search Report (ISR), mailed Sep. 18, 2012, issued for International Application No. PCT/JP2012/065185.
(Continued)

*Primary Examiner* — David Sorkin
*Assistant Examiner* — Abbas Rashid
(74) *Attorney, Agent, or Firm* — Law Office of Katsuhiro Arai (57) ABSTRACT

A centrifugal processing device has structures in which a storage container housing a material is supported such as to rotate freely by a revolving body with a rotating shaft therebetween, and that applies revolution force and rotation force of the storage container to the material by rotating the storage container while revolving the storage container. Rotating shafts and are supported by the revolving body such as to intersect a revolving body center line of the revolving body.

13 Claims, 5 Drawing Sheets

(56) References Cited

U.S. PATENT DOCUMENTS

| | | | |
|---|---|---|---|
| 3,778,033 A * | 12/1973 | Pullman | 366/219 |
| 3,885,357 A * | 5/1975 | Hoyt | 451/327 |
| 4,235,553 A * | 11/1980 | Gall | 366/208 |
| 4,497,581 A * | 2/1985 | Miller | 366/208 |
| 4,728,197 A * | 3/1988 | Reinhard | 366/219 |
| 4,834,548 A * | 5/1989 | Tempel et al. | 366/208 |
| 5,352,037 A * | 10/1994 | Jouvin | 366/219 |
| 5,551,779 A * | 9/1996 | Gantner et al. | 366/217 |
| 5,746,510 A * | 5/1998 | Mark et al. | 366/217 |
| 6,241,380 B1 * | 6/2001 | Bornemann et al. | 366/217 |
| 6,817,751 B2 * | 11/2004 | Huckby et al. | 366/217 |
| 7,182,505 B2 * | 2/2007 | Huckby | 366/217 |
| 7,686,502 B2 * | 3/2010 | Huckby | 366/217 |
| 8,092,075 B2 * | 1/2012 | Ishii | 366/139 |
| 8,534,906 B2 * | 9/2013 | Harada | 366/139 |
| 2002/0145938 A1 | 10/2002 | Sasaki | |
| 2003/0107949 A1 * | 6/2003 | Huckby et al. | 366/217 |
| 2003/0179646 A1 * | 9/2003 | Miller | 366/217 |
| 2003/0214878 A1 * | 11/2003 | Huckby | 366/217 |
| 2006/0109740 A1 * | 5/2006 | Huckby | 366/208 |
| 2007/0025180 A1 * | 2/2007 | Ishii | 366/139 |
| 2008/0192564 A1 * | 8/2008 | Jouvin | 366/7 |

FOREIGN PATENT DOCUMENTS

| | | |
|---|---|---|
| JP | H10-043568 A | 2/1998 |
| JP | 2006-255565 A | 9/2006 |
| JP | 2007-268412 A | 10/2007 |
| WO | 8908495 A1 | 9/1989 |
| WO | 2008/078368 A1 | 7/2008 |
| WO | 2008/078685 A1 | 7/2008 |

OTHER PUBLICATIONS

Doman, M. Haukohl, Flossenschlag eines Delphines, Chemietechnik, Huthig, Heidelberg, DE, vol. 23, No. 4, Apr. 1, 1994.
Supplementary European Search Report (SESR) dated Feb. 10, 2015, issued for corresponding European patent application No. EP12799927.

* cited by examiner

Background Art

CENTRIFUGAL PROCESSING DEVICE

This application is the U.S. National Phase under 35 U.S.C. §371 of International Application PCT/JP2012/065185, filed Jun. 14, 2012, which claims priorities to Japanese Patent Applications No. 2011-132521, filed Jun. 14, 2011, and No. 2012-015398, filed Jan. 27, 2012. The International Application was published under PCT Article 21(2) in a language other than English.

TECHNICAL FIELD

The present invention relates to a centrifugal processing device that is suitable for pulverization, stirring, stirring and defoaming, and the like of materials.

BACKGROUND ART

In general, as a type of centrifugal processing device, a device is known that stirs and defoams a material by rotating a storage container storing the material while revolving the storage container (rotating and revolving type stirring and defoaming device) (for example, refer to Patent Literature 1 and Patent Literature 2).

Figure 6:
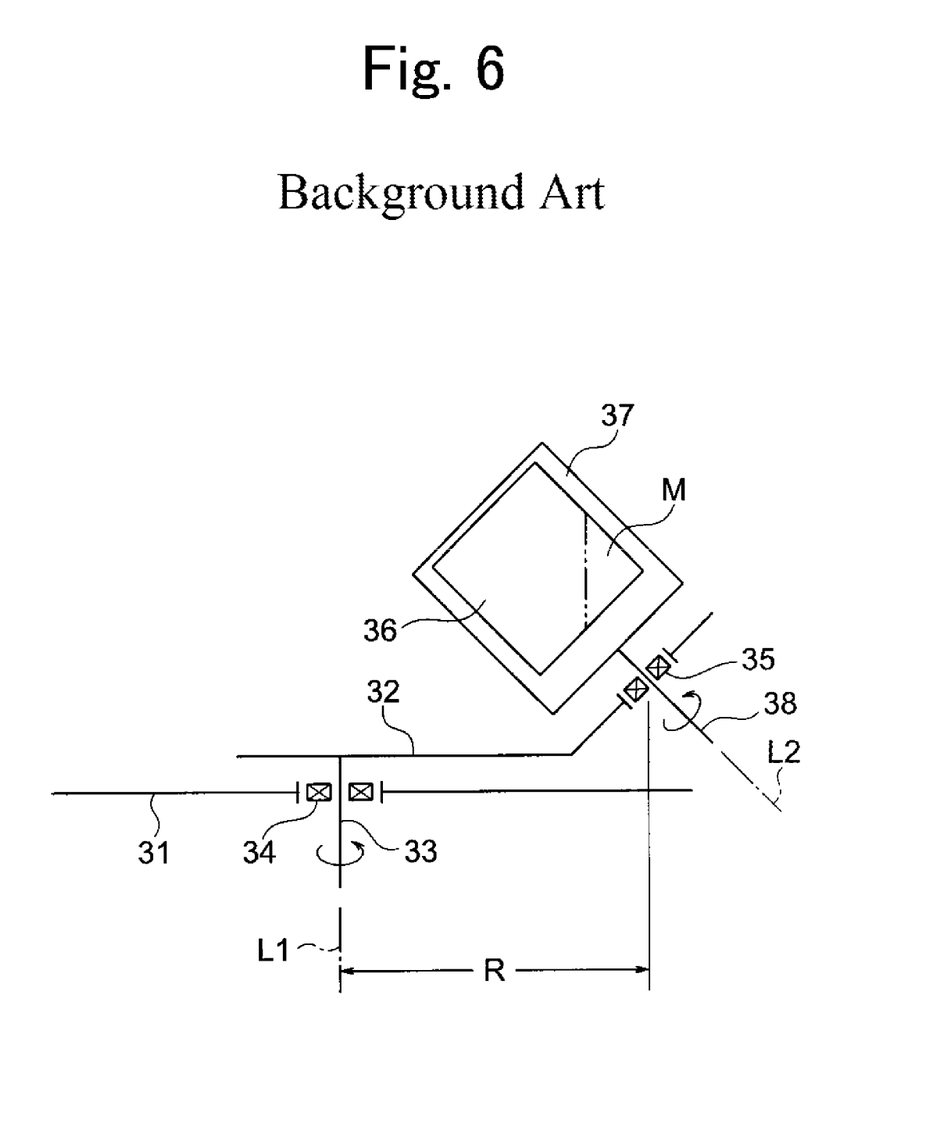
FIG. 6 is an overall configuration diagram of a conventional stirring and defoaming device.

In this conventional type of stirring and defoaming device, main constituent sections excluding a rotation drive system in Patent Literature 1 and Patent Literature 2 are formed as shown in FIG. 6. Specifically, in a center portion of a supporting substrate 31 that is supported horizontally within a casing (not shown), a revolving shaft 33, on a lower portion of which a revolving body 32 is attached, is axially supported such as to revolve freely, with a revolution bearing unit 34 therebetween. The revolving body 32 is formed into a table shape or an arm shape. In addition, the revolving body 33 is often supported in the vertical direction. A rotation bearing unit 35 is mounted in a support position that is at a radius R from a revolving shaft center line L1 of the revolving shaft 33. A rotating shaft 38, on a lower portion of which a container holder 37 housing a storage container 36 therein is provided, is axially supported such as to rotate freely by the rotation bearing unit 35. The storage container 36 is detachably attached to the container holder 37. The storage container 36 is formed such as to open and close freely to allow a material M to be placed therein and removed therefrom. The container holder 37 is formed such as to house the storage container 36 therein, and to fix and hold the storage container 36. In addition, a rotating shaft center line L2 of the rotating shaft 38 is tilted with a tilt angle of, for example, 45 degrees in relation to the vertical direction.

In the stirring and defoaming device shown in FIG. 6, the storage container 36 is rotated around the rotating shaft 38 while revolving with the revolving body 32. As a result, using centrifugal force and internal rotation force working on the material M within the storage container 36, the material M is stirred (kneaded, mixed, and dispersed), and air bubbles present within the material M are released, thereby defoaming the material M.

Patent Literature 1: Japanese Patent Laid-open Publication No. Heisei 10-043568
Patent Literature 1: Japanese Patent Laid-open Publication No. 2006-255565

DISCLOSURE OF INVENTION

Problem to be Solved by the Invention

However, in the conventional stirring and defoaming device, the position at which the storage container 36 is held such as to rotate freely by the revolving body 32 is the support position for the revolving body 32 of the rotation bearing unit 35 that supports the rotating shaft 38 provided in the lower portion of the storage container 36 such as to rotate freely. Because the support position is in a position at a radius R from the revolving shaft center line L1 of the revolving shaft 33, the following issues occur in the conventional stirring and defoaming device.

First, because the support position for rotation of the storage container 36 is apart from the revolving shaft center line L1 in the radius direction by a fairly long distance which is the distance R, a large centrifugal force is applied to the support position during revolution. Furthermore, a difficult operating condition occurs in that heat is generated by high-speed rotation. Specifically, when a bearing is used in a high-centrifugal force environment, all of the grease filling the interior sprays out. As a result, an oil film cannot be formed and insufficient lubrication occurs, thereby leading to heat generation. Therefore, in this difficult operating condition, each constituent section of the device is required to be formed such that connection state and the like of the constituent sections are appropriately maintained and the constituent sections can appropriately work. To solve this necessity, ruggedization, such as increasing the rigidity of each constituent section of the device, is required. Heat generating areas are required to be cooled. The configuration becomes complex.

Secondly, because the support position for rotation of the storage container 36 is apart from the revolving shaft center line L1 in the radius direction by a fairly long distance which is the distance R, the overall device is large in the radial direction and space occupied by the device increases. Furthermore, in accompaniment with ruggedization and weight increase of the constituent sections, power consumption required during operation increases. Cost also increases.

The present invention has been achieved in light of the above-described issues. An object of the present invention is to provide a simply configured and compact centrifugal processing device that is capable of significantly relaxing operating conditions, relaxing strength conditions of each constituent section, reducing power consumption during operation, reducing cost, and performing pulverization, stirring, stirring and defoaming, and the like of materials with certainty.

Means for Solving Problem

To achieve the above-described object, a centrifugal processing device according to a first aspect of the present invention is a centrifugal processing device in which a storage container housing a material is supported such as to rotate freely by a revolving body with a rotating shaft therebetween, and that applies revolution force and rotation force of the storage container to the material by rotating the storage container while revolving the storage container. The rotating shaft is supported by the revolving body such as to intersect a revolving body center line of the revolving body.

In a configuration such as this, the rotating shaft is supported such as to rotate freely such as to intersect with the revolving shaft center line in relation to the revolving body. Therefore, the rotating shaft and the rotation support position thereof is disposed near the revolving shaft center line. Centrifugal force applied to the rotation support position of the rotating shaft is kept small, and the size of the overall device in the radius direction can also be kept small. As a result, the centrifugal processing device of the present invention has a simple configuration, is compact, and is capable of: significantly relaxing operating conditions, relaxing strength conditions of each constituent section, reducing power consumption during operation, reducing cost, and performing pulverization, stirring, stirring and defoaming, and the like of materials with certainty.

In addition, a centrifugal processing device according to a second aspect of the present invention is the centrifugal processing device according to the first aspect, in which the rotating shaft is supported by a rotating shaft bearing unit.

In a configuration such as this, the rotating shaft can be appropriately supported by the rotating shaft bearing unit.

In addition, a centrifugal processing device according to a third aspect of the present invention is the centrifugal processing device according to the second aspect, in which the rotating shaft bearing unit is provided in a position that intersects with the revolving shaft center line of the revolving shaft.

In a configuration such as this, the rotating shaft can be supported by the rotating shaft unit in a position intersecting with the revolving shaft center line of the revolving body. Centrifugal force applied to the rotating shaft bearing unit supporting the rotating shaft can be minimized.

In addition, a centrifugal processing device according to a fourth aspect of the present invention is the centrifugal processing device according to any one of the first to third aspects, in which the rotating shaft intersects the revolving shaft center line at a tilt. The storage container is detachably formed on an outer side of a position on the rotating shaft that intersects with the revolving shaft center line. A revolution force applying mechanism that applies revolution to the revolving body and a rotation force applying mechanism that applies rotation to the rotating shaft are included.

In a configuration such as this, revolution force can be appropriately applied to the revolving body by the revolution force applying means, and rotation force can be appropriately applied to the rotating shaft by the rotation force applying means.

In addition, a centrifugal processing device according to a fifth aspect of the present invention is the centrifugal processing device according the fourth aspect, in which the rotation force applying mechanism has a rotation planetary gear that is fixed to the rotating shaft and a rotation sun gear that meshes with the rotation planetary gear and is provided on the revolving shaft center line.

In a configuration such as this, the storage container can be held such as to revolve freely and rotate freely in a position away from the revolving shaft in a radius direction. Therefore, stirring and defoaming (centrifugal processing) of the material within the storage container can be performed with certainty. In addition, the storage container can be rotated by the rotation force applying means that has a simple configuration that is the rotation planetary gear and the rotation sun gear.

In addition, a centrifugal processing device according to a sixth aspect of the present invention is the centrifugal processing device according the fourth or fifth aspect, in which the revolving shaft center line is set in a vertical direction. The storage container is detachably formed in a container holder that is provided on a lower side of the rotating shaft and can be opened and closed freely.

In a configuration such as this, the storage container can be rotated in a position on the lower side of the rotating shaft while being revolved around the revolving shaft that is in the vertical direction. Therefore, stirring and defoaming of the material within the storage container can be performed with further certainty.

In addition, a centrifugal processing device according to a seventh aspect of the present invention is the centrifugal processing device according the sixth aspect, in which the revolving body is supported such as to revolve freely within a support box body. The support box body is supported such as to be elastically hung from above.

In a configuration such as this, the revolving body can be supported in a well-balanced manner within the support box body that is also supported in a well-balanced manner The storage container can be rotated in a position on the lower side of the rotating shaft while being revolved around the revolving shaft that is in the vertical direction. Therefore, stirring and defoaming of the material can be performed with safety ensured at all times.

In addition, a centrifugal processing device according to an eighth aspect of the present invention is the centrifugal processing device according the sixth or seventh aspect, in which a detecting section is included that detects that the container holder is completely sealed.

In a configuration such as this, the storage container and the container holder are revolved and rotated only when the container holder that holds the storage container in a mounted state therein is completely sealed at all times. Therefore, stirring and defoaming of the material can be performed with safety ensured at all times.

Effect of the Invention

The centrifugal processing device of the present invention has a simple configuration, is compact, and is capable of: significantly relaxing operating conditions, relaxing strength conditions of each constituent section, reducing power consumption during operation, reducing cost, and performing pulverization, stirring, stirring and defoaming, and the like of materials with certainty.

EXPLANATIONS OF LETTERS OR NUMERALS 1 and 41 centrifugal processing device (stirring and defoaming device)
5 revolving body
6 revolving shaft
10 rotating shaft
11 rotating shaft bearing unit
12 container holder
13 storage container
14 rotation planetary gear
15 rotation sun gear
44 L-shaped leaf spring
49 combined rotating shaft and container holder
50 syringe
52 engagement sensor

BEST MODE(S) FOR CARRYING OUT THE INVENTION

Embodiments of a centrifugal processing device of the present invention will be described with reference to FIG. 1 to FIG. 5.

In FIG. 1 to FIG. 5, a stirring and defoaming device that is a type of centrifugal processing device will be described as an example.

(First Embodiment)

Figure 1:
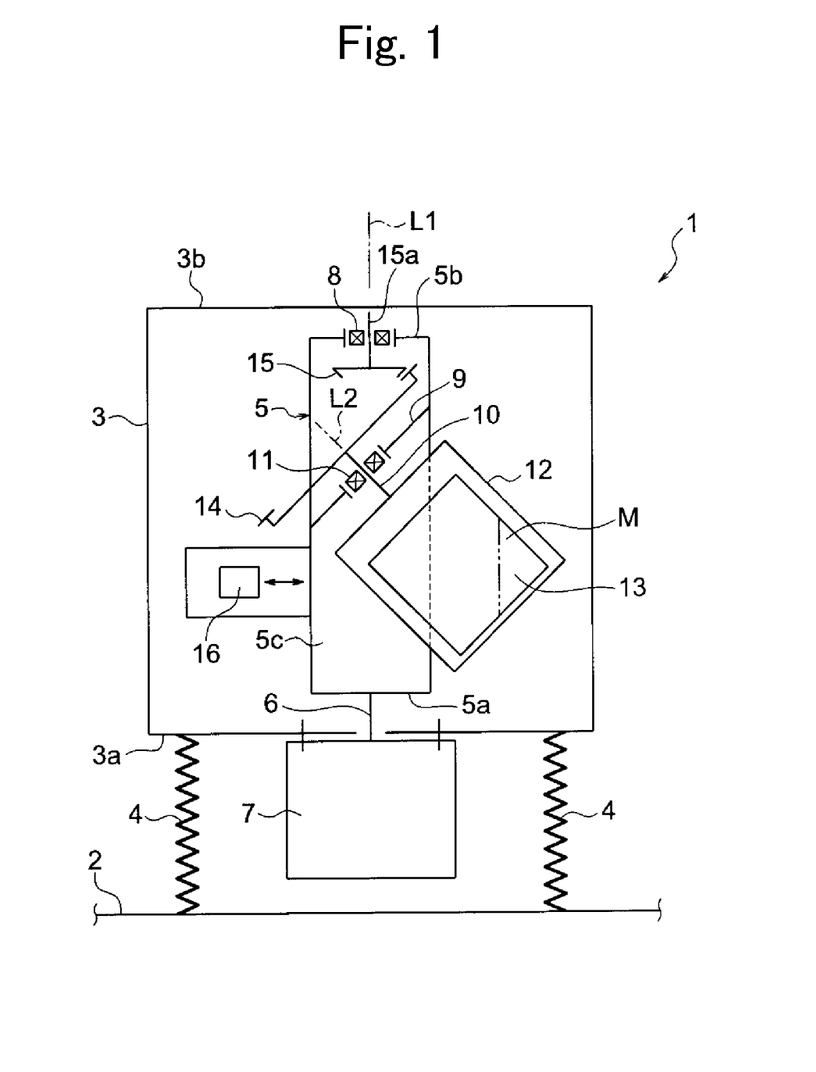
FIG. 1 is a cross-sectional view of an overall configuration of a stirring and defoaming device according to a first embodiment of the present invention.
Figure 2:
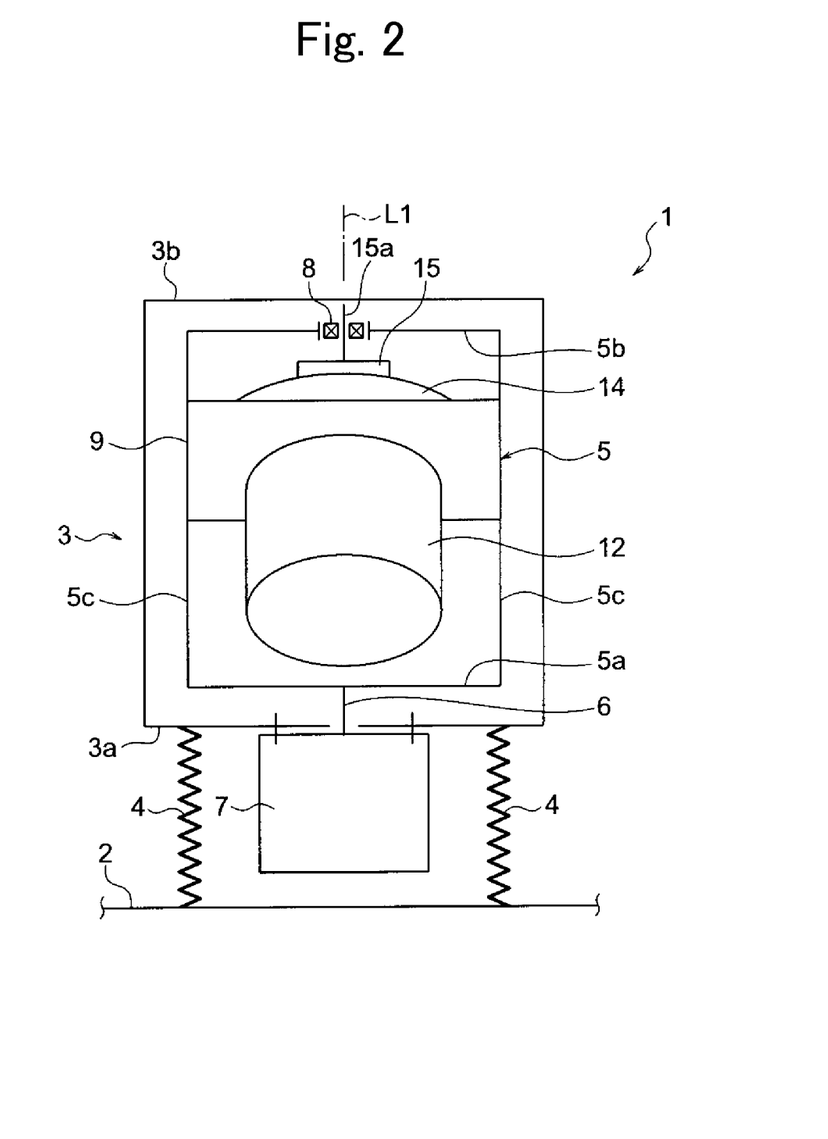
FIG. 2 is a right-side view of FIG. 1.
Figure 3:
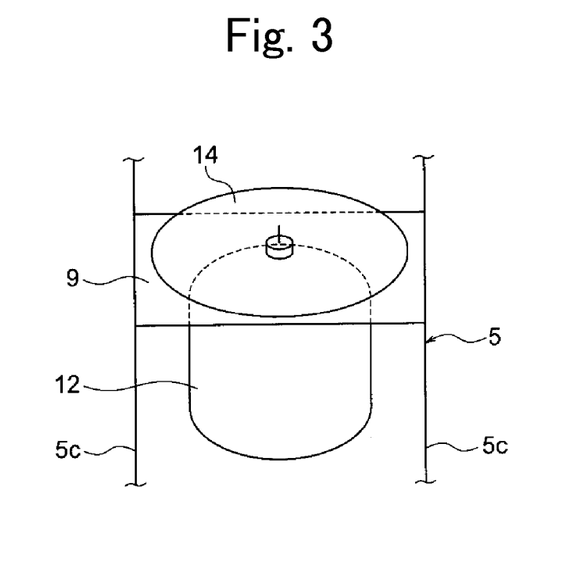
FIG. 3 is a left-side view of main sections in FIG. 1.

FIG. 1 to FIG. 3 show a first embodiment of the stirring and defoaming device that is a centrifugal processing device of the present invention.

As shown in FIG. 1 to FIG. 3, in a stirring and defoaming device 1 according to the present embodiment, a support box body 3 is supported horizontally on a base 2 that forms a bottom portion of a casing, with a vibration absorbing spring 4 therebetween. In the center of the support box body 3, a rectangular frame-shaped revolving body 5 is supported such as to revolve freely, between a bottom plate 3a and a top plate 3b. A revolving shaft center line L1 is disposed vertically. A lower portion of the revolving body 5 is directly connected to and supports an output shaft of a revolution drive motor 7. The revolution drive motor 7 forms a revolution drive mechanism in which a revolving shaft 6 that projects from a lower frame surface 5a of the revolving body 5 such as to match the revolving shaft center line L1 is fixed to a lower surface of the bottom plate 3a. An upper portion of the revolving body 5 is supported such as to revolve freely by a center shaft 15a of a rotation sun gear 15, with a revolving shaft bearing unit 8 provided on an upper frame surface 5b of the revolving body 5 therebetween. The center shaft 15a projects from the lower surface of the top plate 3b such as to match the revolving shaft center line L1. A storage container supporting frame 9 that is tilted by 45 degrees in relation to the revolving shaft center line L1 is fixed between left and right side frame surfaces 5c and 5c of the revolving body 5. In a position of the storage container supporting frame 9 that intersects the revolving shaft center line L1, a rotating shaft 10 is supported such as to rotate freely by a rotating shaft bearing unit 11. As a result, the rotating shaft 10 and the rotating shaft center line L2 are supported such as to intersect the revolving shaft center line L1 with a 45-degree tilt angle. In a lower area outside of the position at which the rotating shaft 10 intersects with the revolving shaft center line L1, a container holder 12 is fixed. A storage container 13 is formed such as to be detachably attached within the container holder 12. The container holder 12 is formed such as to open and close freely in the downward direction for placement and removal of the storage container 13. The storage container 13 is formed such as to open and close freely for placement and removal of a material M. The container holder 12 is formed such as to house the storage container 13 therein, and to fix and hold the storage container 13. An area of the support box body 3 that opposes the container holder 12 is formed such as to open and close freely for attachment and detachment of the storage container 13 to and from the container holder 12. In an upper area of the rotating shaft 10, a rotation planetary gear 14 that forms a rotation force applying mechanism is fixed. The rotation planetary gear 14 meshes with a rotation sun gear 15 in an internal-teeth form. As a result, when the rotation planetary gear 14 revolves together with the revolving body 5, because the rotation planetary gear 14 is meshed with the rotation sun gear 15 that is in a fixed state, the rotation planetary gear 14 rotates. According to the present embodiment, because the gears 14 and 15 are meshed in the internal-teeth form, when the rotation planetary gear 14 revolves in the clockwise direction when viewed vertically downwards (the same applies hereafter), the rotation planetary gear 14 rotates in the counter-clockwise direction. As a result of a simple configuration that is the meshing of two gears 14 and 15, drive in which the revolution direction and the rotation direction of the rotation planetary gear 14 are opposite can be easily achieved. On the center shaft 15a of the rotation sun gear 15, a known electromagnetic clutch that can switch between a fixed state and a no-load rotatable state may be provided. Alternatively, a known speed varying mechanism that freely adjusts the rotation speed and rotation direction of the center shaft 15a may be provided. On the side of the rotating body 5 opposing the storage container 13, a counterweight 16 is formed such as to approach and move away from the revolving shaft center line L1 freely by a known mechanism. An area of the support box body 3 opposing the counterweight 16 is formed such as to open and close freely for weight adjustment.

Next, working according to the present embodiment will be described.

<Operation Preparatory Work>

First, position adjustment of the counterweight 16 is performed based on the mass of the material M to be stirred and defoamed.

Next, the storage container 13 is removed from the container holder 12, the support box body 3, and the casing. The material M is placed in the storage container 13 and the storage container 13 is sealed. Next, the sealed storage container 13 is mounted in a predetermined position within the container holder 12 and fixed. The container holder 12, the support box body 3, and the casing are closed and the preparatory work is completed.

<Stirring and Defoaming Operation>

When the revolution drive motor 7 of the revolution force applying mechanism is rotated and the revolving body 5 is revolved around the revolving shaft center line L1 in the clockwise direction, the rotation planetary gear 14 that is meshed in the internal-tooth form with the rotation sun gear 15 of the rotation force applying mechanism that is in a fixed state rotates in the counter-clockwise direction by revolving in the clockwise direction. As a result, the storage container 13 rotates in the counter-clockwise direction together with the container holder 12 while revolving in the clockwise direction together with the revolving body 5. The material M within the storage container 13 receives centrifugal force generated by the revolution, and gas components included in the material M are released. The material M is also stirred by the synergetic effect of rotation force generated by the rotation and the revolution force. Furthermore, according to the present embodiment, because the revolution direction and the rotation direction of the storage container 13 are opposite, the material M is stirred with high stirring efficiency.

In addition, when an electromagnetic clutch is provided on the center shaft 15a of the rotation sun gear 15, and the center shaft 15a and the rotation sun gear 15 are switched between a fixed state and a no-load rotatable state, the storage container 13 can be operated such that the rotation state is switched between simultaneous revolution and rotation when the center shaft 15a is in the fixed state, and revolution and rotation when the center shaft 15a is in the no-load rotatable state.

In addition, when the rotation speed and the rotation direction of the center shaft 15a and the rotation sun gear 15 are changed by a speed varying mechanism, changes in the rotation speed and changes in the rotation direction of the storage container 13 can be continuously performed without stopping the device. In this instance, operation can be appropriately performed while changing the speed and direction of the rotation and revolution of the storage container 13 in correspondence with the progression of stirring and defoaming of the material M in the storage container 13.

The material M is appropriately stirred and defoamed in the present embodiment in this way.

In the stirring and defoaming device 1 according to the present embodiment, the rotating shaft 10 is supported such as to rotate freely such as to intersect with the revolving shaft center line L1 in relation to the revolving body 5. Therefore, the rotating shaft 10 and the mounting position of the rotating shaft bearing unit 11 that is the rotation support position of the rotating shaft 10 are disposed near the revolving shaft center line L1. Centrifugal force applied to the rotation support position of the rotating shaft 10 is kept small, and the size of the overall device in the radius direction can also be kept small. As a result of the centrifugal force being small, the required operating conditions and design conditions, such as rigidity, of the constituent sections of the device can be significantly relaxed.

In addition, the rotating shaft 10 can be supported by the rotating shaft bearing unit 11 in the position that intersects with the revolving shaft center line L1 of the revolving body 5. The centrifugal force applied to the rotating shaft bearing unit 11 supporting the rotating shaft 10 can be minimized, and relaxing of the above-described conditions can be significantly realized. In addition, according to the present embodiment, two types of centrifugal force generated by the container holder 12 that houses the storage container 13 and the rotation planetary gear 14 that are attached on both sides of the rotating shaft 10 with the rotating shaft bearing unit 11 therebetween synergistically work on an inner ring of the rotating shaft bearing unit 11. Therefore, to withstand the centrifugal forces, for example, two rotating shaft bearing units 11 may be arrayed in parallel in the axial direction. Alternatively, the rotating shaft 10 may be projected further towards the rotation sun gear 15 side than the rotation planetary gear 14, and an auxiliary bearing that axially supports the rotating shaft 10 may be added in the projecting portion.

In addition, the rotating shaft 10 intersects the revolving shaft center line L1 at a tilt. The storage container 13 is detachably formed on the lower side of the rotating shaft 10. Therefore, the storage container 13 can be held such as to revolve freely and rotate freely in a position apart from the revolving shaft center line L1 in the radius direction. As a result, stirring and defoaming of the material M in the storage container 13 can be performed with certainty.

In addition, the rotation force applying mechanism can be formed by the rotation planetary gear 14 that is fixed on the upper side of the rotating shaft 10 and the rotation sun gear 15 that is provided on the revolving center line L1 and meshes with the rotation planetary gear 14. The storage container 13 can be rotated by a simple configuration.

As described above, the stirring and defoaming device 1 according to the present embodiment has a simple configuration, is compact, and is capable of: significantly relaxing operating conditions, relaxing strength conditions for constituent sections, reducing power consumption during operation, reducing cost, and performing stirring and defoaming of materials with certainty.

(Second Embodiment)

Figure 4:
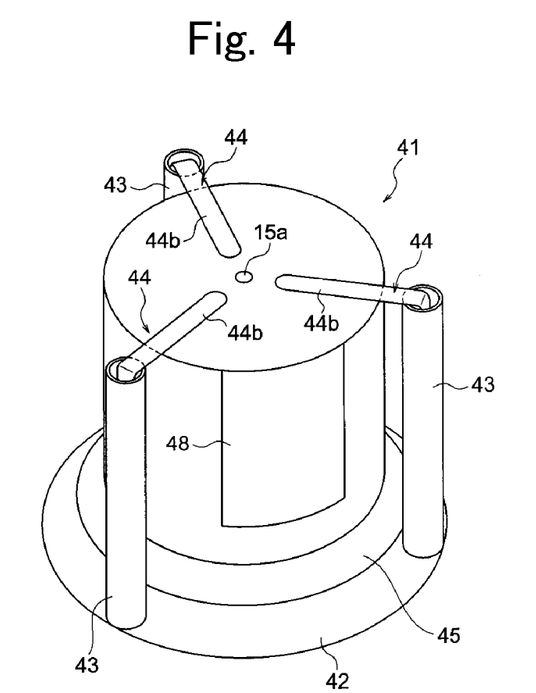
FIG. 4 is a perspective view of a stirring and defoaming device according to a second embodiment of the present invention.
Figure 5:
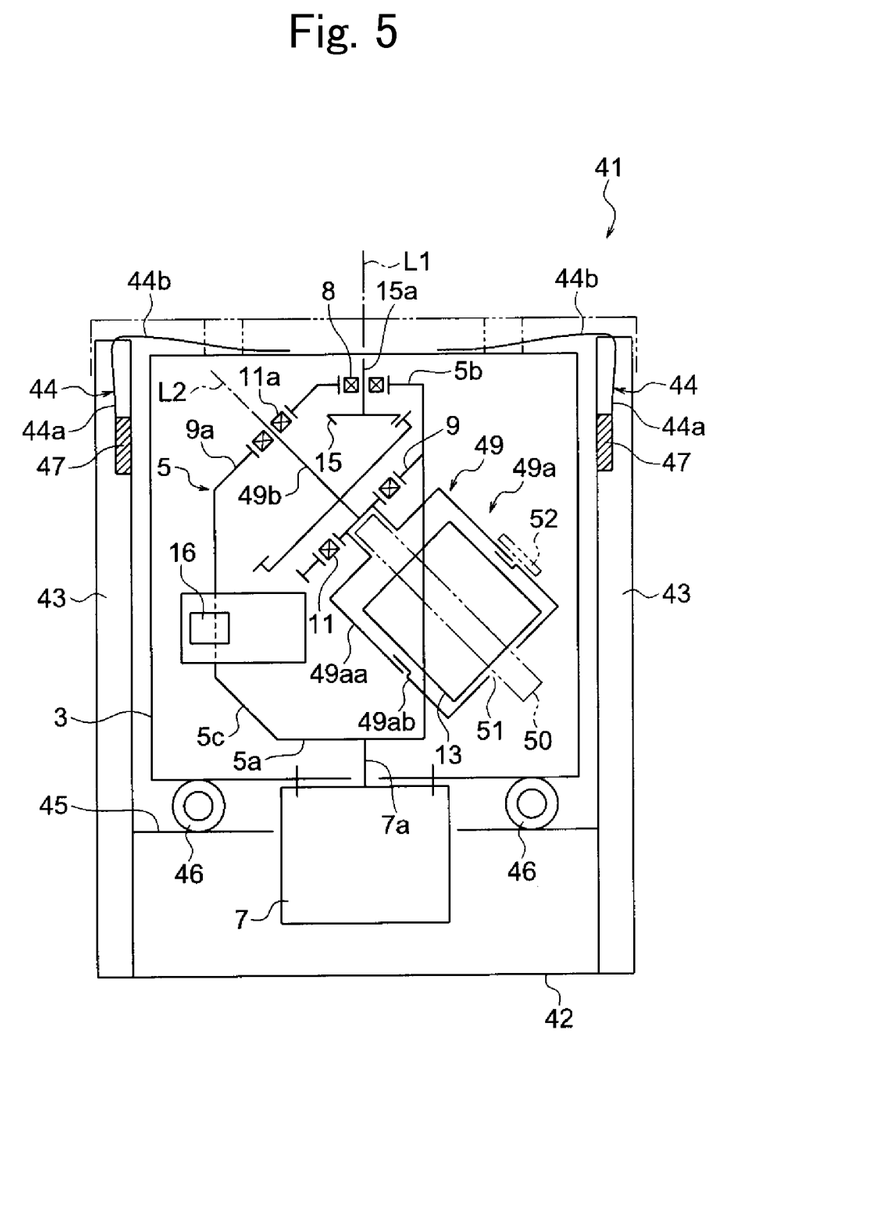
FIG. 5 is a front vertical cross-sectional view of FIG. 4.

FIG. 4 and FIG. 5 show a second embodiment of the stirring and defoaming device that is the centrifugal processing device of the present invention. Sections that are the same as those according to the first embodiment are given the same reference numbers.

As shown in FIG. 4 and FIG. 5, in a stirring and defoaming device 41 according to the present embodiment, three support columns 43 are planted on a circular base 42 at a 120-degree interval. The circular base 42 forms a bottom portion of the overall device. The support box body 3 is elastically hung from above by an L-shaped leaf spring 44 provided in an upper end portion of each of the three support columns 43. In addition, the support box body 3 is elastically supported from below by a rubber cushion 46 (equivalent to the vibration absorbing spring 4 according to the first embodiment) disposed on a circular disk-shaped horizontal substrate 45 fixed to the lower portions of the three support columns 43. In each L-shaped leaf spring 44, a vertical piece 44a is inserted into the support column 43 and fixed by a stay 47, and a free end portion of a lateral piece 44b is fixed to the upper surface of the top plate 3b of the support box body 3. The support box body 3 is horizontally hung by the spring force. A vertical axis in the center of the support box body 3 is the revolving shaft center line L1. The rotation sun gear 15 is fixed to the top plate 3b by the center shaft 15a. The revolution drive motor 7 is fixed to the lower surface of the bottom plate 3a, and the output shaft 7a thereof projects vertically upwards. The rectangular frame-shaped revolving body 5 is disposed with the revolving shaft center line L1 held vertically and supported such as to revolve freely between the bottom plate 3a and the top plate 3b of the support box body 3. The lower portion of the revolving body 5 is directly connected to the output shaft 7a of the revolution drive motor 7. The upper portion of the revolving body 5 is supported such as to revolve freely by the center shaft 15a of the rotation sun gear 15 with the revolving shaft bearing unit 8 provided on the upper frame surface 5b of the revolving body 5 therebetween. The storage container supporting frame 9 that is tilted by 45 degrees in relation to the revolving shaft center line L1 is fixed between the left and right side frame surfaces 5c and 5c of the revolving body 5. Furthermore, an upper storage container supporting frame 9a that is connected to the upper frame surface 5b and is parallel with the storage container supporting frame 9 is fixed between the left and right side frame surfaces 5c and 5c of the revolving body 5. A combined rotating shaft and container holder 49 is supported such as to rotate freely by rotating shaft bearing units 11 and 11a on the storage container supporting frame 9 and the upper storage container supporting frame 9a. The rotating shaft center line L2 that is formed by the center axis of the combined rotating shaft and container holder 49 is supported such as to intersect the revolving shaft center line L1 with a 45-degree tilt angle. Furthermore, as shown in FIG. 5, the combined rotating shaft and container holder 49 is formed by a hollow container holder section 49a and a hollow rotating shaft section 49b. The hollow rotating shaft section 49b intersects with the revolving shaft center line L1. The hollow container holder section 49a is connected to an area that is below and outside the position at which the rotating shaft section 49b intersects with the revolving shaft center line L1. The combined rotating shaft and container holder 49 is supported such as to rotate freely and such as not to move in the axial direction at two locations: the rotating shaft bearing unit 11 in the position intersecting with the revolving shaft center line L1 and the rotating shaft bearing unit 11a in a position away from the rotating shaft bearing unit 11 in the obliquely upward direction. Therefore, the combined rotating shaft and container holder 49 is more stably supported such as to rotate freely. The container holder section 49a is divided into two in the axial direction, and is formed by a main body portion 49aa that has a pouch-shaped recessing portion that is supported by the rotating shaft bearing unit 11 on the revolving body 5, and a bottomed cap portion 49ab that is detachable from the main body portion 49aa. In one end portion of the main body portion 49aa and the other end portion of the cap portion 49ab, engaging projecting and recessing sections (not shown) are formed that exactly engage with each other in a bisecting position in the circumferential direction. An interior space of the cap portion 49ab is formed to be a size that allows the storage container 13 to be exactly inserted. In addition, when a syringe 50 (see FIG. 5) is used as the storage container, a through hole 51 from which the syringe 50 projects may be formed in the bottom portion of the cap portion 49ab. In addition, as shown in FIG. 5, an engagement sensor 52 serving as a detecting section for detecting that the main body portion 49aa and the cap portion 49ab are in a locked state with respective engaging projecting and recessing portions appropriately engaged is provided on the outer circumference of the container holder section 49a. The rotation planetary gear 14 that forms the rotation force applying mechanism is fixed midway of the rotating shaft section 49b of the combined rotating shaft and container holder 49. The rotation planetary gear 14 meshes with the rotation sun gear 15 in the internal-tooth form. As a result, when the rotation planetary gear 14 revolves together with the rotation sun gear 15, because the rotation planetary gear 14 is meshed with the rotation sun gear 15 that is in the fixed state, the rotation planetary gear 14 rotates. According to the present embodiment, because the gears 14 and 15 are meshed in the internal-teeth form, when the rotation planetary gear 14 revolves in the clockwise direction when viewed vertically downwards (the same applies hereafter), the rotation planetary gear 14 rotates in the counter-clockwise direction. As a result of a simple configuration that is the meshing of two gears 14 and 15, drive in which the revolution direction and the rotation direction of the rotation planetary gear 14 are opposite can be easily achieved. On the center shaft 15a of the rotation sun gear 15, a known electromagnetic clutch that can switch between a fixed state and a no-load rotatable state may be provided. Alternatively, a known speed varying mechanism that freely adjusts the rotation speed and rotation direction of the center shaft 15a may be provided. On the side of the rotating body 5 opposing the storage container 13, a counterweight 16 is formed such as to approach and move away from the revolving shaft center line L1 freely by a known mechanism. An area of the support box body 3 opposing the counterweight 16 is formed such as to open and close freely for weight adjustment. As shown in FIG. 4, an area of the support box body 3 opposing the combined rotating shaft and container holder 49 is formed such as to open and close freely by an opening/closing door 48 to attach and detach the storage container 13 to and from the combined rotating shaft and container holder 49.

Next, working according to the present embodiment will be described.

<Operation Preparatory Work>

First, position adjustment of the counterweight 16 is performed based on the mass of the material M to be stirred and defoamed.

Next, the opening/closing door 48 is opened, and the storage container 13 is removed from the combined rotating shaft and container holder 49 and the support box body 3. The material M is placed in the storage container 13, and the storage container 13 is sealed. Next, the sealed storage container 13 is mounted within the cap portion 49ab of the combined rotating shaft and container holder 49. The cap portion 49ab is inserted into the main body portion 49aa such that male and female portions of the respective engaging recessing and projecting portions are aligned. Then, the cap portion 49ab and the main body portion 49aa are relatively rotated in the circumferential direction and appropriately engaged, thereby being mounted and fixed in a predetermined position. The opening/closing door 48 of the support box body 3 is closed and the preparatory work is completed. At this time, under a condition that the engagement sensor 52 has detected that the cap portion 49ab and the main body portion 49aa are in a locked state in which the respective engaging recessing and projecting portions are appropriately engaged, the subsequent stirring and defoaming operation can be performed. As a result, lock failure of the container holder section 49a can be detected with certainty, and operation in a lock failure state can be prevented. Even when centrifugal force is applied during stirring and defoaming operation, the container holder section 49 can be prevented from being erroneously released with certainty. As the engagement sensor 52, any known configuration including a mechanical or electrical configuration or both may be used. The configuration may be selected based on detection purpose. Detection signals from the sensor may be electrically controlled, and conduction may be appropriately performed.

<Stirring and Defoaming Operation>

When the revolution drive motor 7 of the revolution force applying mechanism is rotated and the revolving body 5 is revolved in the clockwise direction around the revolving shaft center line L1, the rotation planetary gear 14 that is meshed in the internal-teeth form with the rotation sun gear 15 of the rotation force applying mechanism that is in a fixed state rotates in the counter-clockwise direction by revolving in the clockwise direction. As a result, the storage container 13 rotates in the counter-clockwise direction together with the combined rotating shaft and container holder 49 while revolving in the clockwise direction together with the revolving body 5. The material M within the storage container 13 receives centrifugal force generated by the revolution, and gas components included in the material M are released. The material M is also stirred by the synergetic effect of rotation force generated by the rotation and the revolution force. Furthermore, according to the present embodiment, because the revolution direction and the rotation direction of the storage container 13 are opposite, the material M is stirred with high stirring efficiency.

According to the present embodiment, in addition to work similar to that according to the first embodiment, further, the support box body 3 is horizontally supported by the L-shaped leaf springs 44 and the rubber cushion 46 in a well-balanced manner. Therefore, revolution of the revolving body 5 within the support box body 3 and rotation of the storage container 13 are stably and smoothly performed. A very efficient stirring and defoaming operation is performed.

In addition, as the elastic hanging method of the support box body 3, other configurations may be used instead of the L-shaped leaf springs 44. For example, as indicated by chain lines in FIG. 5, a top plate may be bridged on the peak portions of the three support columns 43. The support box body 3 may then be hung from the top plate by an elastic material, such as a coil spring or a diaphragm.

In addition, when a resin material is used for the constituent sections, a temperature sensor and an air-conditioning means may be provided such as to hold the temperature within the support box body 3 to a temperature at which the resin does not deform.

In addition, when stirring and defoaming is performed with the interior of the storage container 13 in a vacuum state, a tube for a vacuum path may be passed through the center of the center shaft 15a of the rotation sun gear 15 from outside of the support box body 3 and led inside. Then, the tube may be passed through the upper storage container supporting frame 9a from the inner side to the outer side, passed through the rotating shaft section 49b of the combined rotating shaft and container holder 40 from outside to inside, and finally led into the storage container 13. As a result, the storage container 13 may be communicated with a vacuum source.

The present invention is not limited to the above-described embodiments. Modifications can be made as required.

For example, to match a radius position from the revolving shaft center line L1 of the material M during the stirring and defoaming operation with a radius position in an existing stirring and defoaming measure, the projecting length of the rotating shaft 10 from the rotating shaft bearing unit 11 and the holding position of the storage container 13 by the container holder 12 may be adjusted. As a result, effective stirring and defoaming can be performed using existing stirring and defoaming conditions for the material M.

In addition, as the rotation force applying mechanism, other than that formed by gears according to each of the above-described embodiments, the rotation force applying mechanism may be formed such that rotation force is applied using a driving force transmitting mechanism, such as a known friction drive pulley. In addition, the installed number of support columns and L-shaped leaf springs 44 is not limited to three pairs as according to the above-described embodiments. The support box body 3 may be hung and supported by at least one pair. Moreover, as a detecting section taking the place of the engagement sensor 52 that detects the locked state of the container holder section 49*a*, a rotation inhibiting body that inhibits rotation by coming into contact with the cap portion 49*ab* that is not mounted in an appropriate position, if the lock is in an incomplete state and revolution or rotation starts, may be fixed to the support box body 3.

The invention claimed is:

1. A centrifugal processing device comprising:
    a storage container for housing a material therein, said storage container having a rotating drive shaft and being freely rotatable by force of the rotating drive shaft; and
    a revolving body freely rotatable around a revolving body center line, wherein the storage container is attached to the revolving body so as to revolve the storage container while rotating the storage container, thereby applying revolution force and rotation force of the storage container to the material,
    wherein the rotating drive shaft obliquely intersects the revolving body center line.

2. The centrifugal processing device according to claim 1, wherein:
    the rotating drive shaft is supported by a rotating shaft bearing unit.

3. The centrifugal processing device according to claim 2, wherein:
    the rotating shaft bearing unit is provided in a position that intersects the revolving body center line.

4. The centrifugal processing device according to claim 1, wherein:
    the storage container is detachably formed on an outer side of a position on the rotating drive shaft that intersects the revolving body center line; and
    a revolution force applying mechanism that applies revolution to the revolving body and a rotation force applying mechanism that applies rotation to the rotating drive shaft are included.

5. The centrifugal processing device according to claim 4, wherein:
    the rotation force applying mechanism has a rotation planetary gear that is fixed to the rotating drive shaft and a rotation sun gear that meshes with the rotation planetary gear in internal-teeth form and is provided on the revolving body center line.

6. The centrifugal processing device according to claim 5, wherein:
    the revolving body center line is set in a vertical direction; and
    the storage container is detachably formed in a container holder that is provided on a lower side of the rotating drive shaft and can be opened and closed freely.

7. The centrifugal processing device according to claim 6, wherein:
    the revolving body is supported such as to revolve freely within a support box body; and
    the support box body is supported such as to be elastically hung from above.

8. The centrifugal processing device according to claim 7, wherein:
    a detecting section is included that detects that the container holder is completely sealed.

9. The centrifugal processing device according to claim 6, wherein:
    a detecting section is included that detects that the container holder is completely sealed.

10. The centrifugal processing device according to claim 4, wherein:
    the revolving body center line is set in a vertical direction; and the storage container is detachably formed in a container holder that is provided on a lower side of the rotating drive shaft and can be opened and closed freely.

11. The centrifugal processing device according to claim 10, wherein:
    a detecting section is included that detects that the container holder is completely sealed.

12. The centrifugal processing device according to claim 10, wherein:
    the revolving body is supported such as to revolve freely within a support box body; and
    the support box body is supported such as to be elastically hung from above.

13. The centrifugal processing device according to claim 12, wherein:
    a detecting section is included that detects that the container holder is completely sealed.

* * * * *